March 29, 1955 — H. H. MERWIN ET AL — 2,704,914

GRINDING MACHINE

Filed Oct. 9, 1952 — 4 Sheets-Sheet 1

INVENTORS
H. H. MERWIN
F. J. SWEENEY

BY
W. C. Parnell
ATTORNEY

March 29, 1955     H. H. MERWIN ET AL     2,704,914
GRINDING MACHINE
Filed Oct. 9, 1952     4 Sheets-Sheet 2
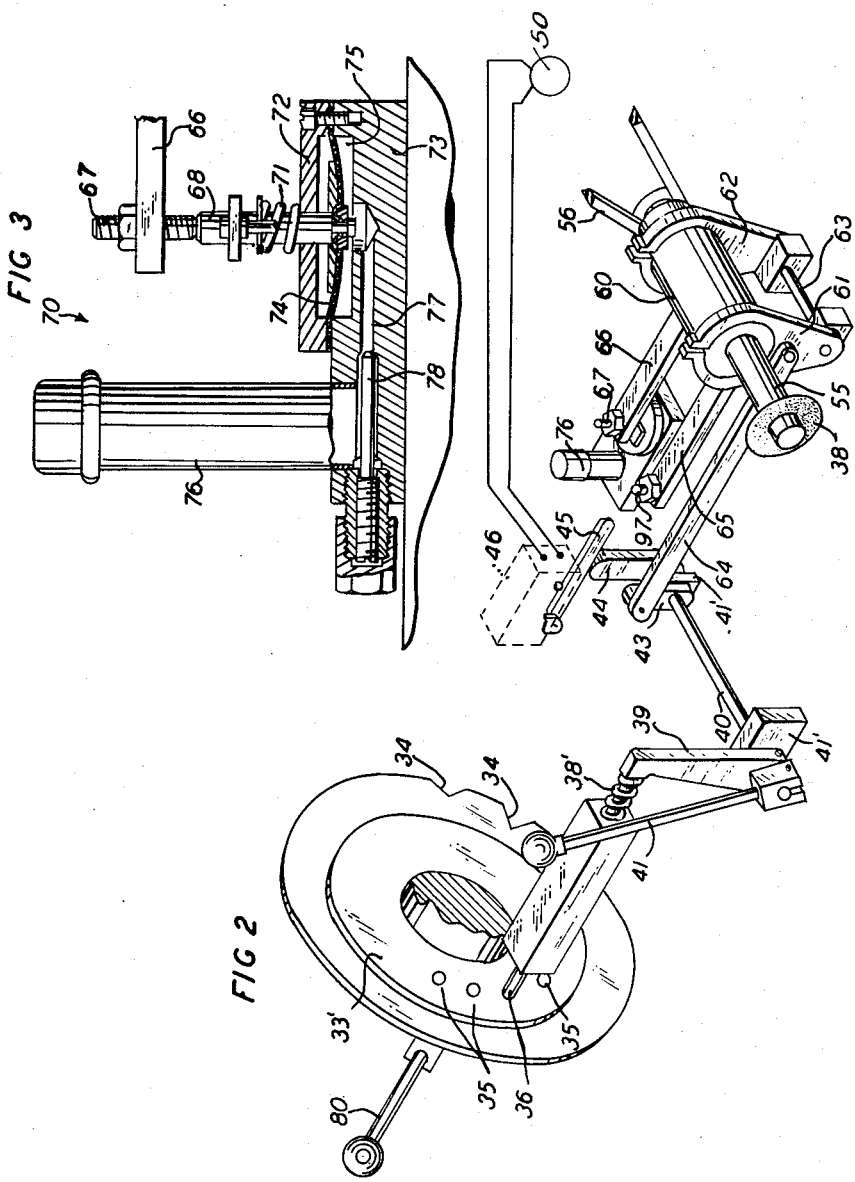
INVENTORS
H. H. MERWIN
F. J. SWEENEY
BY
ATTORNEY March 29, 1955
H. H. MERWIN ET AL
2,704,914
GRINDING MACHINE
Filed Oct. 9, 1952
4 Sheets-Sheet 3
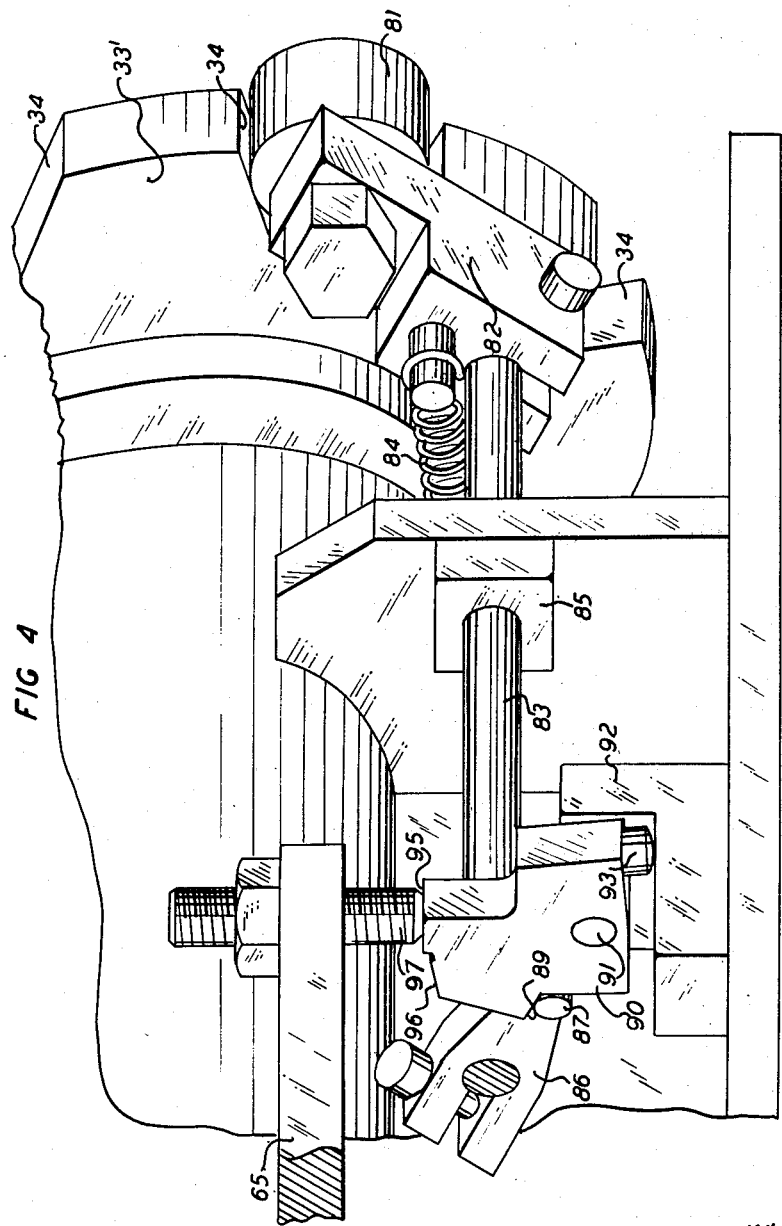
INVENTORS
H.H. MERWIN
F. J. SWEENEY
BY
*W.E. Parnell*
ATTORNEY March 29, 1955    H. H. MERWIN ET AL    2,704,914
GRINDING MACHINE Filed Oct. 9, 1952    4 Sheets-Sheet 4

INVENTORS
H.H. MERWIN
F. J. SWEENEY

BY
*[signature]*
ATTORNEY

United States Patent Office 2,704,914
Patented Mar. 29, 1955

2,704,914
GRINDING MACHINE

Harry H. Merwin, Rutherford, N. J., and Francis J. Sweeney, Andover, Mass., assignors to Western Electric Company, Incorporated, New York, N. Y., a corporation of New York Application October 9, 1952, Serial No. 313,882

2 Claims. (Cl. 51—98)

This invention relates to apparatus for cutting articles and more particularly to apparatus for cutting notches of varying depths in ends of cylindrical articles.

In the manufacture of certain electrical units for use in the communication arts, coils are to be wound on cylindrical forms made of suitable material such as fused quartz. The coil forms must have their ends of predetermined contours including, for example, interfitting projections and notches so that they may in assembly interengage each other or other electrical units. It is, therefore, necessary to have an accurate linkage of the functions of a cutting machine to produce accurately positioned grooves or notches in an article to assure subsequent interfitting of the articles.

The object of the present invention is an apparatus which, although simple in structure, is highly efficient in performing predetermined cutting operations on articles.

With this and other objects in view, the invention comprises an apparatus for cutting articles wherein a chuck for supporting an article may be rocked into any of a plurality of positions relative to a cutter and coupled with means to cause relative movement of the chuck and cutter only when the chuck is in one of the given positions.

More specifically, the means for moving cutter relative to the work is linked with a latching mechanism and a switch operating element whereby the cutter is not only held inoperative, but away from the article until the chuck has been moved into one of the cutting positions after which the chuck will be locked against rotation during closing of the switch to energize the driving means for the cutter and movement of the cutter into the article. Furthermore, the movement of the cutter may be rapid until it nears the article after which the movement during the cutting operation is controlled by a cushioning unit.

Other objects and advantages will be apparent from the following detailed description when considered in conjunction with the accompanying drawings, wherein:

Fig. 2 is an isometric view of the apparatus with certain portions removed to illustrate some of the operating mechanism of the apparatus;

Fig. 3 is a fragmentary sectional view of the cushioning unit for the cutter feeding mechanism;

Fig. 4 is an enlarged fragmentary isometric view of the chuck locating mechanism;

Figure 6:
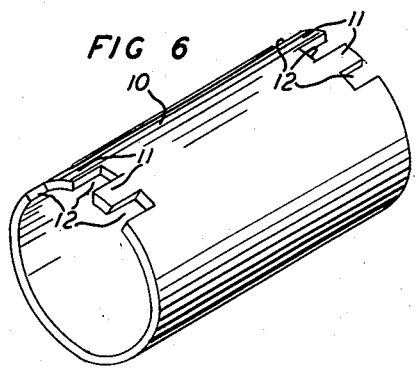

Referring now to the drawings, attention is first directed to Fig. 6 which illustrates an article 10. The article in the present embodiment of the invention is cylindrical in general contour, formed of fused quartz and is to serve as a core for a coil to interengage other cores or other electrical units by being provided with projections 11 through the formation of notches 12. It is the purpose of the present invention to cut the notches 12 at predetermined positions and varying depths.

The apparatus for processing article 10 includes a chuck 14 of the conventional spring closing type, for the article, having the conventional gripping jaws 15 forced inwardly into gripping positions by a spring 16 acting on an external member or collar 17, having a shoulder 18, and an engaging member 19. It will be noted that the tapered outer surfaces of the jaws 15, while contacting the tapered inner surface of the adjacent member, will cause the jaws to move inwardly to grip the article when the jaws are moved to the left (Fig. 1) by the member 19, the collar 17 and the spring 16. The chuck 14 is mounted on a spindle 21 which is journalled in bushings 22 of a housing 23, supported by vertical members 24 mounted on a base 25. The chuck 14 is normally disposed in closed position by the spring 16, but may be opened to release an article 10 for removal, and to receive another article by the actuation of a handle 28 from the solid line position shown in Fig. 1 to the dotted line position shown therein. The handle 28, pivoted at 29, is connected to a yoke 30, pivoted at 31, by a link 32. The yoke 30 has portions 33 positioned to engage the shoulder 18 of the chuck 14 to move the collar 17 with the element 19 against the force of the spring to free the element including the clamping jaws 15 into open position. Through the aid of the handle 28, the chuck is held in the open position until one article 10 is removed from the chuck and another inserted in place.

The spindle 21 supporting the chuck 14 at one end thereof, has a disc-like controlling member 33' removably mounted at the other end thereof. The member 33' is selected from a plurality of members having V-shaped notches 34 in the peripheries thereof and apertures 35 to receive a locking pin or latch 36. The sizes and positions of the notches in the members 33' vary with the requirements for notches and projections and the positions of the apertures 35 correspond to the positions of the notches 34 so that the chuck may control the position of the article relative to a cutter 38.

The latch 36 is mounted for longitudinal movement in a support 37 and is normally urged to the right (Fig. 1) by a spring 38'. An arm 39, mounted for rocking movement on a shaft 40, has its upper end disposed in engagement with the latch rod 36 whereby movement of a handle 41 from the dotted line position (Fig. 1) to the solid line position will move the arm 39 to move the latch 36 against the force of a spring 38 into locking position, the lower end of the handle being fixedly mounted on the shaft 40. The shaft 40, as shown in Fig. 2, is journalled in suitable bearings 41' and has levers 43 and 44 mounted thereon. The lever 44 engages a pivotally supported arm 45 which is adapted to actuate a normally open switch into closed position. The switch 46 is disposed in a circuit (not shown) for a motor 50 for driving the cutter 38.

Figure 5:
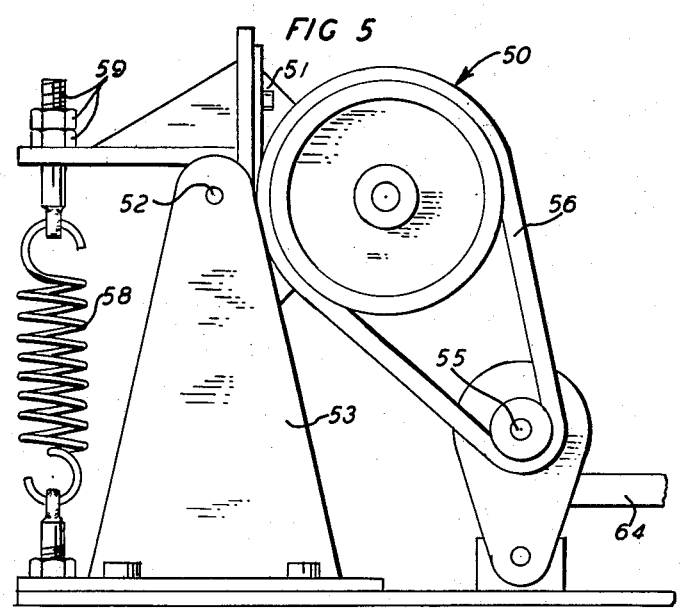
Fig. 5 is a side elevational view of the cutter support and driving means of the apparatus and, Fig. 6 is an enlarged isometric view of the article after certain of the cutting operations.

The motor 50 is mounted on a cradle 51, pivotally supported at 52 by a bracket 53. The motor 50 is operatively connected to a spindle 55 for the cutter 38 by a belt and pulley connection 56. A variable tension is created in the belt 56 by a spring 58 which normally urges the cradle 51 counter-clockwise (Fig. 5). The adjustable means for the spring 58 is identified by its connection 59 with the cradle.

The spindle 55 is journalled in bearings (not shown) in a housing 60. The housing 60 has vertical members 61 and 62 fixedly mounted thereon, the lower ends of the members being mounted for rocking movement on a shaft 63. The cutter supporting unit in general and the vertical member 61 thereof in particular, is operatively connected to the lever 43 by a link 64, whereby rocking movement of the shaft 40, through actuation of the handle 41, will move the cutter relative to the chuck and article.

The member 61 of the cutter unit has an arm 65 fixed thereto and extending laterally therefrom for a purpose hereinafter described. An arm 66 similar in contour to the arm 65 fixed at one end to the member 62 is substantially parallel with the arm 65 and carries an adjustable threaded member 67 adjacent its outer end to engage a plunger 68 of a cushioning unit indicated generally at 70 (in Fig. 3). The plunger 68 is normally held upwardly by a spring 71 and extends through a cover 72 of a housing 73 where its inner end is connected centrally to a diaphragm 74. The diaphragm 74 extends over a chamber 75 which is normally filled with a liquid such as oil from a reservoir 76. The liquid will pass by gravity through a passageway 77 controlled by an adjustable needle valve 78 and into the chamber 75. When the threaded element 67 engages the plunger 68, movement of the arm 65 and, thereby the cutter 38, will be reduced to a given speed depending on the position of the needle valve 78 to controlling the passage of the fluid out of the chamber 75.

Figure 1:
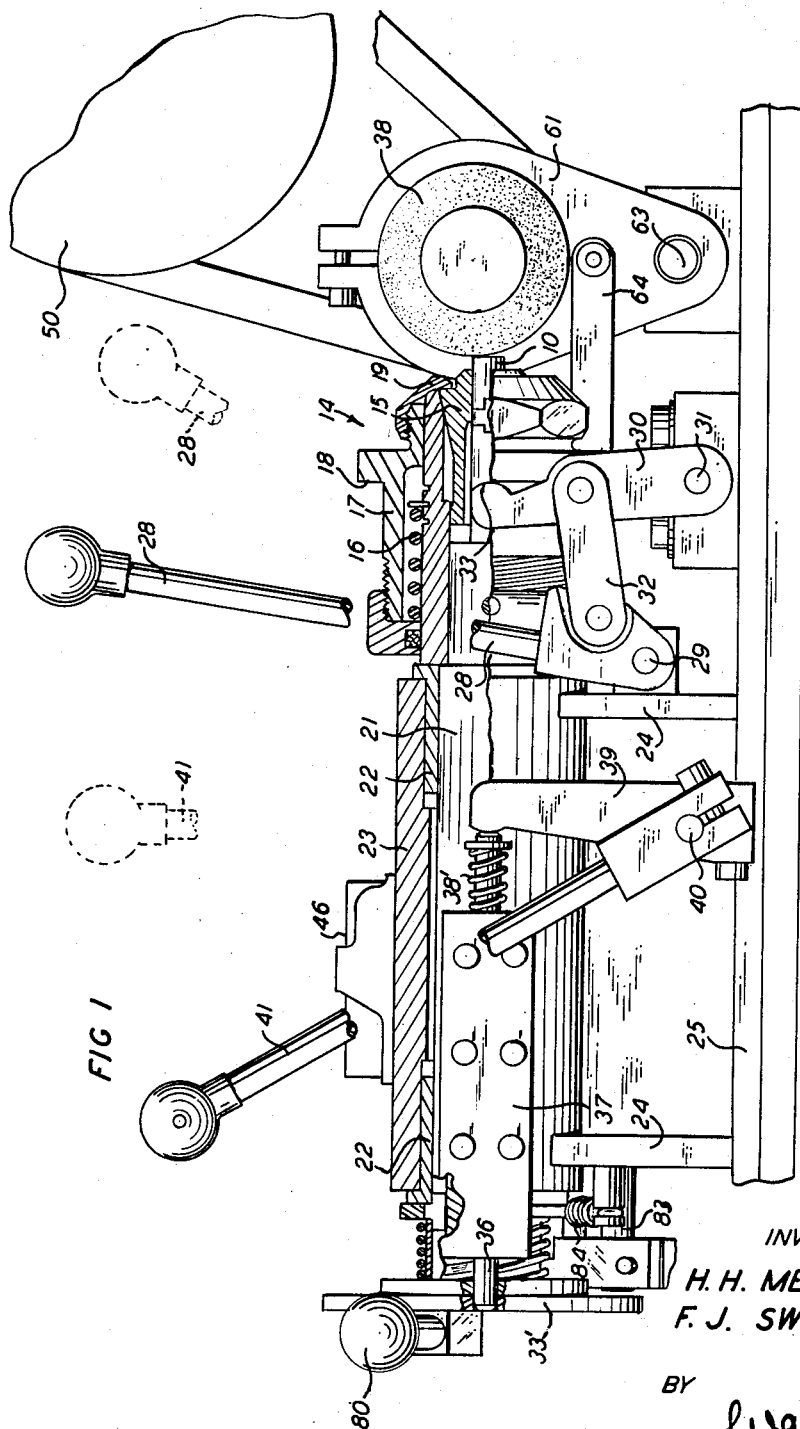
Fig. 1 is a side elevational view of the apparatus, portions thereof being shown in section.

Returning now to the rocking means for the chuck 14, attention is directed to Figs. 1, 2 and 4, the first two of which illustrate a handle 80, mounted on the plate 33' whereby the plate may be rocked to rock the spindle 21 and the chuck 14 to position the article 10 in any desired one of the cutting positions. A roller 81, carried by an arm 82 fixedly mounted on a spindle 83, is normally urged by the force in a spring 84 to ride on the periphery of the plate 33' and enter any of the V-shaped notches 34. The size or depth of each notch 34 determines the position of the roller 81 as well as the spindle 83. The spindle 83 is journalled for rocking movement in suitable bearings 85 and has an arm 86 fixedly mounted thereon. The arm carries a pin 87 adjacent its outer end to engage a surface 89 of a locating element 90. The element 90 of the cutting apparatus (shown in Fig. 4) is pivotally supported at 91 by a bracket 92 and has a cutaway portion (not shown) to house a spring-pressed plunger 93 which engages the horizontal portion of the bracket 92 tending to rock the element counter-clockwise. The element 90 is provided with two locating surfaces 95 and 96 to be engaged by an adjustable threaded member 97 mounted in the outer end of the arm 65.

Considering now the operation of the apparatus, let it be assumed that the locating element or plate 33' for the article 10 has been mounted on the spindle 21 and located in the first cutting position. The cutter 38 and its supporting mechanism is normally held away from the chuck by the spring 58 (Fig. 5) so that the article may be loaded in the chuck through actuation of the handle 28 into the dotted-line position (Fig. 1). When the article is mounted in the chuck and the handle 28 allowed to return to its normal position, the handle 41 may be actuated from the dotted-line position to the solid-line position (Fig. 1). During this movement of the handle 41, various things take place in a given order. By viewing Fig. 2, it will be observed that the cutting unit is connected to the shaft 40, which is rocked by the movement of the handle 41 and this movement may be as rapid as desired, there being nothing other than the force of the spring 58 to control movement of the cutter toward the article until the cutter is brought into close proximity with, but not engaging the article. Before reaching this position, that is, before reaching a position where the lever 44 will actuate the arm 45 to close the switch 46 to energize the motor 50, the arm 39 will have moved the latch 36 into the adjacent aperture 35. If the locating element 33' has not been moved into one of the locating positions to align one of the apertures 35 with the latch 36, the latch 36 will engage the adjacent surface of the element preventing further rocking movement of the shaft 41 and thereby preventing movement of the cutter into the article and closing of the switch to energize the motor 50. If, however, the element 33' is correctly positioned to locate one of the apertures 35 with the latch 36, the latch will enter the aperture to permit additional rocking movement of the shaft 40 to close the switch 46 and cause energization of the driving means for the cutter prior to movement of the cutter into engagement with the article. The moment the latch 36 enters the aperture 35, the spindle 21 and the chuck are locked against rocking movement and this condition exists until the cutter completes its work on the article and is returned to a position beyond the end of the article.

The mechanism shown in Fig. 3 functions during the cutting operation, the arm 66 moving with the cutter unit causing the element 67 to engage the plunger 68, and through the retarding effect of the fluid, the movement of the cutter into the work will be reduced to the most efficient speed. The arm 65 with the adjustable member 97 in cooperation with the mechanism shown in Fig. 4, will control the distance the cutter moves into the work and thereby the depth of the notch formed in the article. After one cutting operation has been completed, the handle 41 may be returned to its normal position after which the operator may rock the chuck and an article to the next position through the aid of the handle 80 and the operation may be repeated through the actuation of the handle 41. These operations may continue in their successive order until the desired number of notches have been cut in one end of the article after which the chuck may be opened to remove the article for another article or to reverse it in the chuck so that notches may be cut in the other end thereof. Through the aid of the apparatus, the functions of the various units thereof are linked together for operation in a given sequence and coupled with safety features whereby inaccuracies are eliminated and incorrect functions prevented.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for cutting articles comprising a rotatable cutter, a movable carriage therefor, a spindle mounted for rotary motion about its axis, a chuck to removably hold an article mounted on one end of the spindle with its centerline coincident with the axis of the spindle, a control member mounted on the spindle adjacent the other end thereof and having sets of apertures therein disposed at given spaced positions about the axis of the spindle, means to rock the spindle with the chuck and control member, a latch supported for movement relative to the control member and receivable in one of the sets of apertures singly to thereby secure the control member, spindle and chuck against rotation in cutting positions, means to move the latch toward the control member and for variable distances into its set of apertures singly, a mechanism operatively connecting the latch moving means and the carriage for the cutter whereby the cutter will be moved into engagement with the article after the latch enters the selected one of its set of apertures, a rockably supported stop member having surfaces disposed varied distances from its axis and adapted to be rocked into stop position, means under the control of the other set of apertures to rock the stop member to predetermined positions, and an arm fixed to the carriage to engage the surface of the stop member in the stop position to limit movement of the cutter into the article.

2. An apparatus for cutting articles comprising a rotatable cutter, a movable carriage therefor, a spindle mounted for rotary motion about its axis, a chuck to removably hold an article mounted on one end of the spindle with its centerline coincident with the axis of the spindle, a control member mounted on and adjacent the spindle, the other end of the spindle with apertures therein disposed at given spaced positions about the axis of the spindle, means to rock the spindle with the chuck and control member, a latch supported for movement relative to the control member and receivable in the apertures singly to thereby secure the control member, spindle and chuck against rotation in cutting positions, means to move the latch toward the control member and into the apertures singly, a mechanism operatively connecting the latch moving means and the carriage for the cutter to move the cutter into engagement with the article after the latch enters the selected aperture, an electric motor supported adjacent the carriage to drive the cutter, a normally open switch in a circuit controlling the energization of the motor, and an element actuable by said mechanism to close the switch to energize the motor to drive the cutter after the latch enters the selected aperture.

References Cited in the file of this patent

UNITED STATES PATENTS

| | | |
|---|---|---|
| 1,101,505 | Nicolaysen | June 23, 1914 |
| 1,152,315 | Hastings | Aug. 31, 1915 |
| 1,311,583 | Zetterlund | July 29, 1919 |
| 1,971,598 | Condon | Aug. 28, 1934 |
| 1,980,359 | Shippy | Nov. 13, 1934 |
| 2,027,726 | Fletcher | Jan. 14, 1936 |
| 2,090,151 | Poole | Aug. 17, 1937 |
| 2,180,771 | Poole | Nov. 21, 1939 |
| 2,349,786 | Flygare | May 23, 1944 |
| 2,455,004 | Garside | Nov. 30, 1944 |
| 2,467,161 | Sheeley | Apr. 12, 1949 |

FOREIGN PATENTS

| | | |
|---|---|---|
| 116,110 | Great Britain | June 6, 1918 |
| 536,957 | Germany | Oct. 29, 1931 |